(12) United States Patent
Muto et al.

(10) Patent No.: US 7,546,673 B2
(45) Date of Patent: Jun. 16, 2009

(54) METHOD FOR ELECTRIC MOTOR TERMINAL WELDING ISOLATION

(75) Inventors: Hiroyuki Muto, Haga-Gun (JP); Masami Nakano, Gotenba (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 12/043,882

(22) Filed: Mar. 6, 2008

(65) Prior Publication Data

US 2009/0056104 A1 Mar. 5, 2009

(30) Foreign Application Priority Data

Aug. 29, 2007 (JP) ............................. 2007-223250

(51) Int. Cl.
*H02K 15/00* (2006.01)
(52) U.S. Cl. ..................................... 29/596; 219/137.2
(58) Field of Classification Search .................. 29/596, 29/601, 602.1–623, 598, 840, 857, 860, 874, 29/877, 878, 884; 219/90, 86, 111, 132, 219/137, 136, 86.1, 86.21, 86.7, 91.1, 91.2, 219/137.7, 137.71; 180/444, 443; 310/46, 310/48; 228/25, 101, 182
See application file for complete search history.

(56) References Cited

U.S. PATENT DOCUMENTS

| 6,657,163 | B1 * | 12/2003 | Blankenship et al. .. 219/137.71 |
| 7,427,726 | B2 * | 9/2008 | Enyedy et al. ............... 219/136 |
| 2005/0179329 | A1 * | 8/2005 | Okazaki et al. ............... 310/71 |
| 2007/0278875 | A1 * | 12/2007 | Haga et al. ..................... 310/71 |

FOREIGN PATENT DOCUMENTS

| JP | 2002-354755 | * | 5/2001 |
| JP | 2007-1364 | | 1/2007 |

OTHER PUBLICATIONS

Nesterov, "Tap Switch with Remote Control for Resistance Spot Welding Machine MTPT-400", 1976, The Welding Institute, 1976 No. 1, pp. 66-67.*

* cited by examiner

*Primary Examiner*—Khoa D Huynh
*Assistant Examiner*—Jeffrey Carley
(74) *Attorney, Agent, or Firm*—Babcock IP, PLLC

(57) ABSTRACT

In a manufacturing method of an electric motor, at a time of in-sequence arc welding each of one end of a plurality of lined-up connector terminals to each of a plurality of lined-up detection signal output terminals by a welding rod provided in a torch of an arc welding machine, the method connects each of the other ends corresponding to the respective one end of a plurality of connector terminals to each of earth terminals of the arc welding machine in sequence.

4 Claims, 4 Drawing Sheets

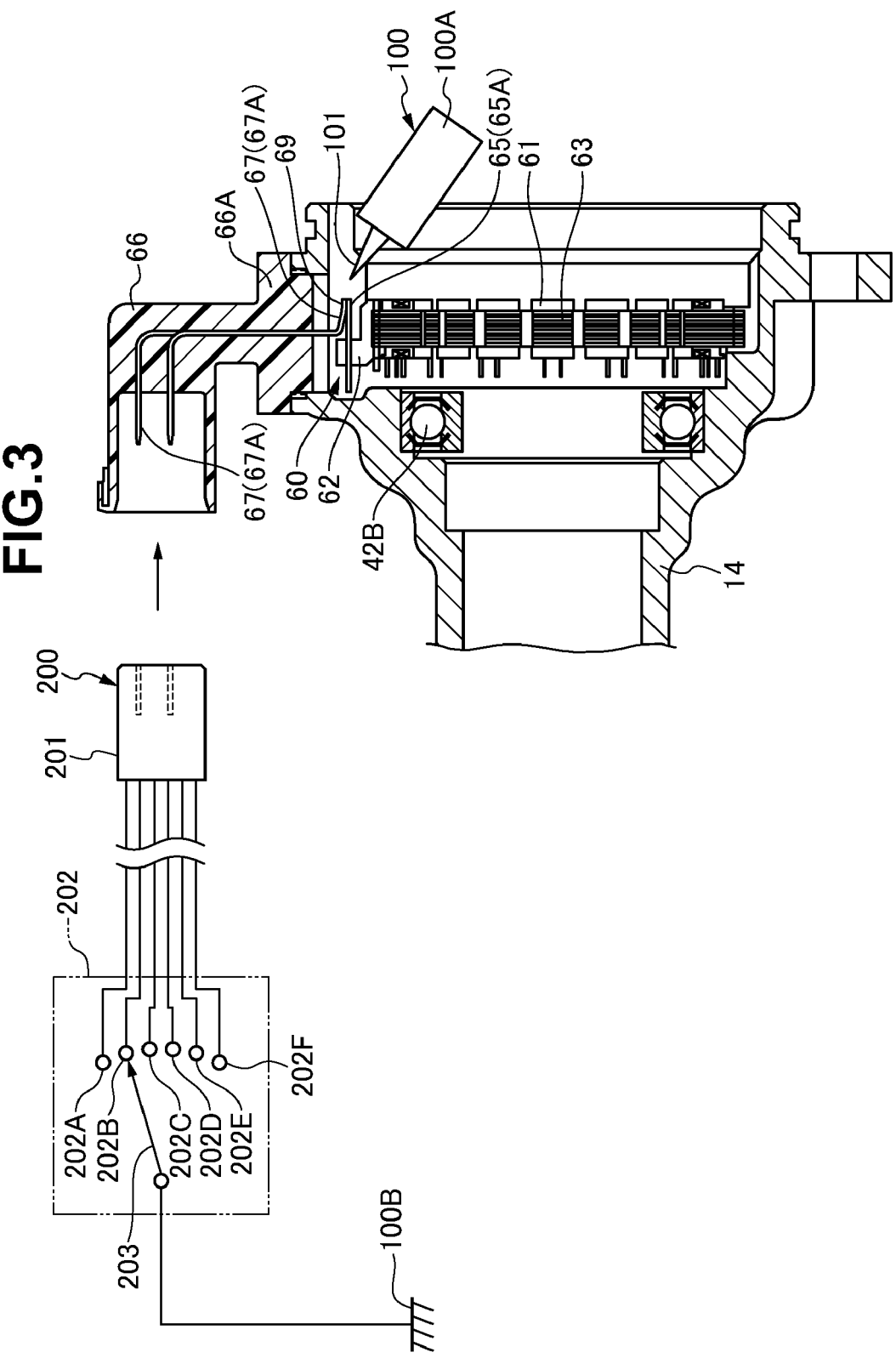

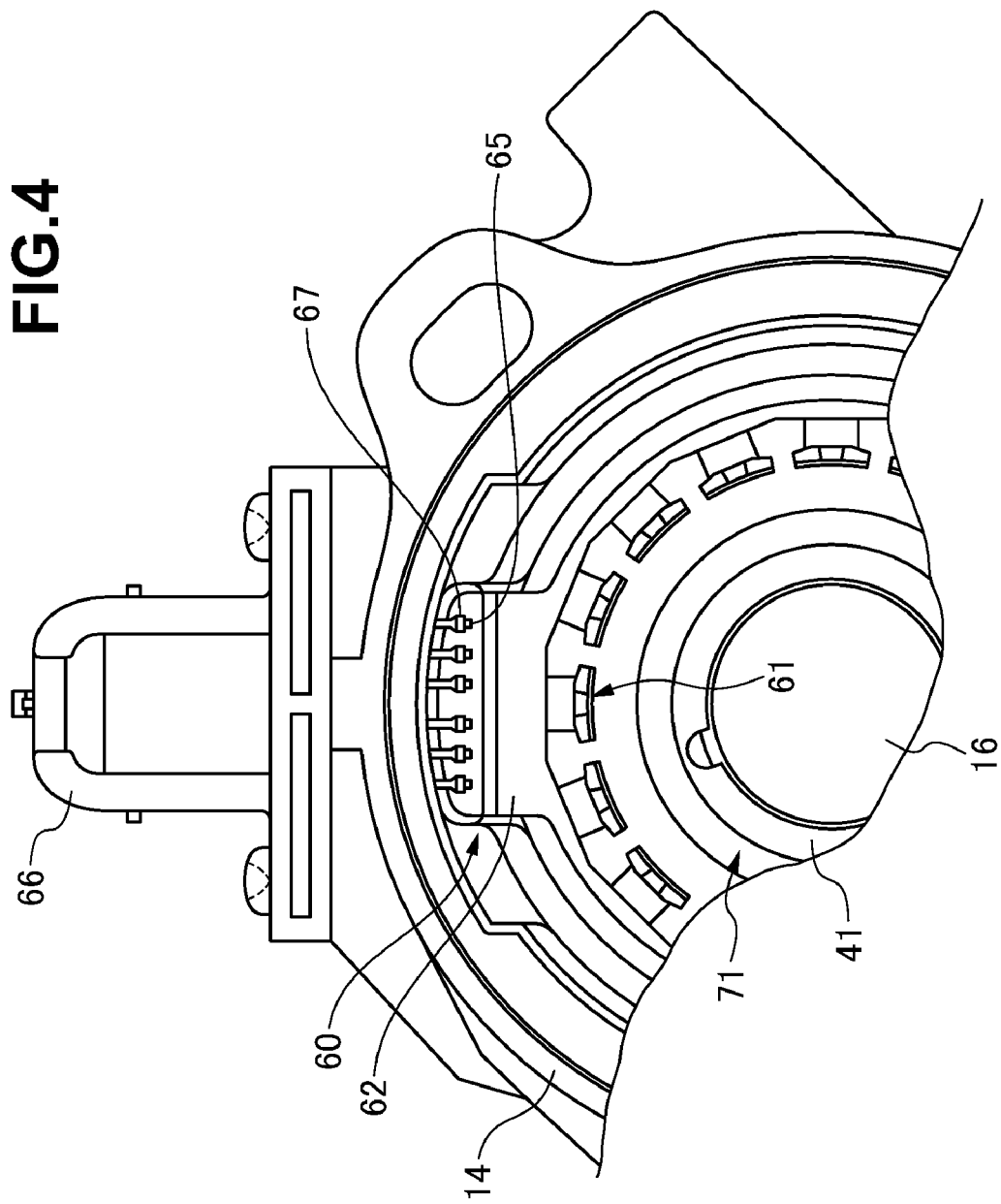

METHOD FOR ELECTRIC MOTOR TERMINAL WELDING ISOLATION

BACKGROUND OF THE INVENTION

1. Field of the Invention

The present invention relates to manufacture of an electric motor, which is preferably used in a motor-driven power steering apparatus or the like. More particularly, the invention relates to an improved method for forming multiple close proximity motor electrical interconnections within the motor assembly via arc welding.

2. Description of the Related Art

A brushless motor (an electric motor) used in a motor-driven power steering apparatus or the like has a motor rotor having a permanent magnet, and a motor stator provided with a core around which a plurality of coils are wound. The motor rotor rotates by switching a current application to the coil, as described in Japanese Patent Application Laid-Open No. 2007-1364 (patent document 1). For example, in a rack type motor-driven power steering apparatus, a coaxial type brushless motor is used, a rack shaft is inserted into a rotating shaft of the motor rotor, and the motor stator is formed in a side of a housing formed in a vehicle body side. Further, in the brushless motor, in order to decide a timing of switching the current application to the coil, a resolver is provided as a position detecting sensor detecting a rotational position of the motor rotor with respect to the motor stator. The resolver is constituted by a resolver stator attached to the side of the housing, and the resolver rotor is attached to the side of the motor rotor.

In the conventional brushless motor, respective one end of a plurality of lined-up power supply connecting connector terminals (connecting terminals) are arc welded in sequence to a plurality of lined-up feed terminals (connected terminals) connected to the coil terminals of the motor stator, by a welding rod provided in a torch of an arc welding machine. At this time, all portions of the other ends of a plurality of connector terminals are collectively connected to an earth terminal of the arc welding machine.

At a time of in-sequence arc welding one end of each of a plurality of lined-up connector terminals by the welding rod of the arc welding machine, all of the other ends of the connector terminals are collectively connected to the earth terminal of the arc welding machine. Accordingly, as well as between the welding rod of the arc welding machine and one end of a selected connector terminal corresponding to the present welded subject, arc(s) would also be generated between the welding rod of the arc welding machine and one end of other connector terminal(s) which are adjacent to the selected connector terminal, so that there is a risk that the arc becomes unstable. Therefore, there is a risk of deteriorating a weld quality between one end of each of the plurality of connector terminals and the corresponding plurality of feed terminals.

SUMMARY OF THE INVENTION

An object of the present invention is to stabilize the welding arc generation so as to improve a weld quality at a time of arc welding one end of each of a plurality of lined-up connecting terminals to each of a plurality of lined-up connected terminals in sequence.

The present invention relates to a manufacturing method of an electric motor, comprising the steps of at a time of in-sequence arc welding each of one end of a plurality of lined-up connecting terminals to each of a plurality of lined-up connected terminals by a welding rod provided in a torch of an arc welding machine, in-sequence switching and connecting each of the other ends corresponding to the respective one end of said plurality of connecting terminals to each of earth terminals of the arc welding machine.

BRIEF DESCRIPTION OF THE DRAWINGS

The present invention will be more fully understood from the detailed description given below and from the accompanying drawings which should not be taken to be a limitation on the invention, but are for explanation and understanding only.

FIG. 3 is a schematic view showing a terminal welding method of a resolver stator; and FIG. 4 is a side elevational view of a main portion in FIG. 3.

DESCRIPTION OF THE PREFERRED EMBODIMENTS

Figure 1:
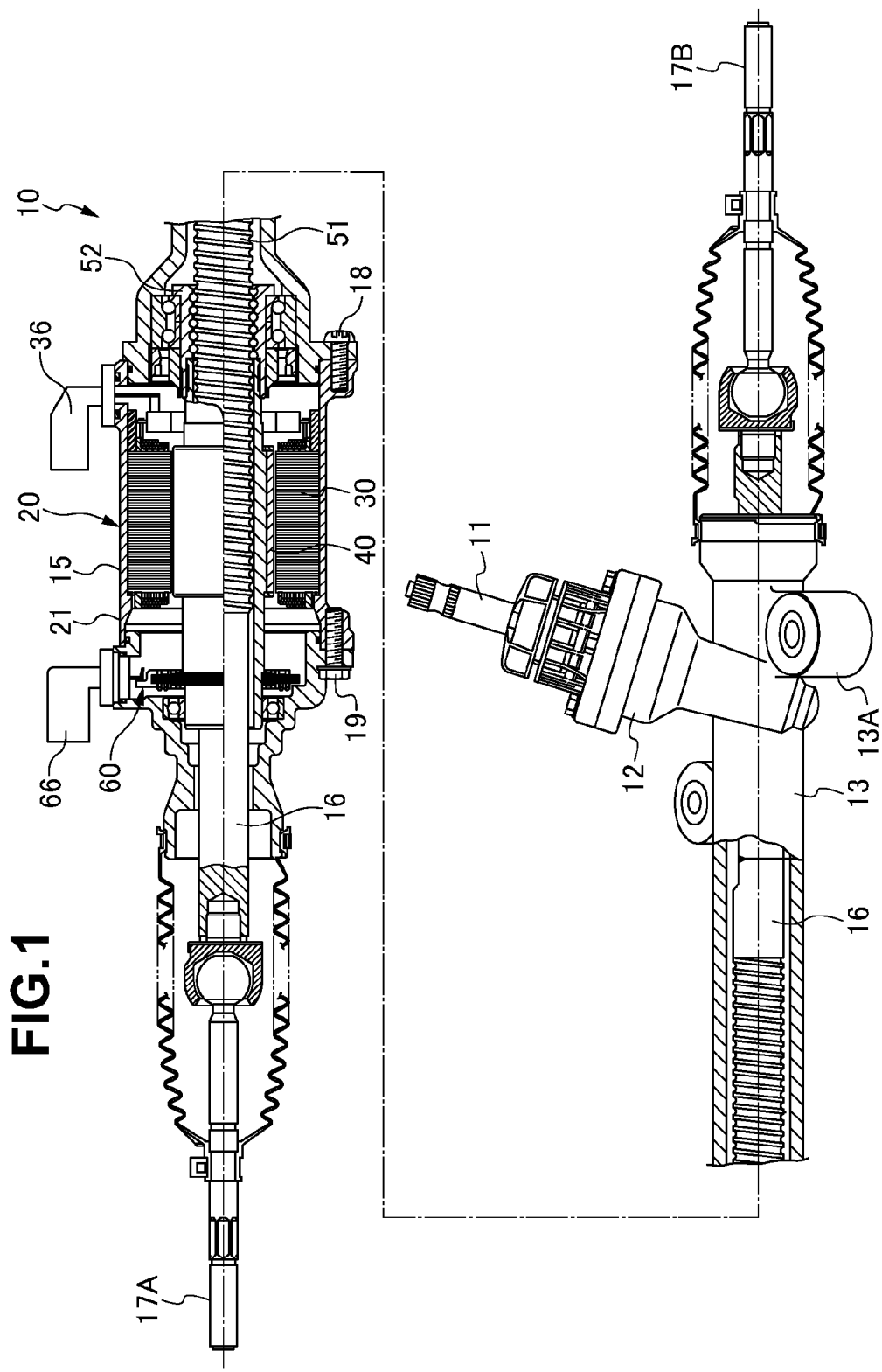
FIG. 1 is a general view showing a motor-driven power steering apparatus.

In the motor-driven power steering apparatus, a brushless motor 20 which is coaxial with the rack shaft 16 is structured by attaching a motor housing 21 made of aluminum or the like to each of the first housing portion 13 and the second housing portion 14 by bolts 18 and 19 in such a manner as to construct a yoke of the motor portion 15. The brushless motor 20 (the electric motor) has a motor stator 30, a motor rotor 40 rotatably arranged in an inner peripheral side of the motor stator 30, and a resolver 60 detecting a rotational position of the motor rotor 40 with respect to the motor stator 30.

Figure 2:
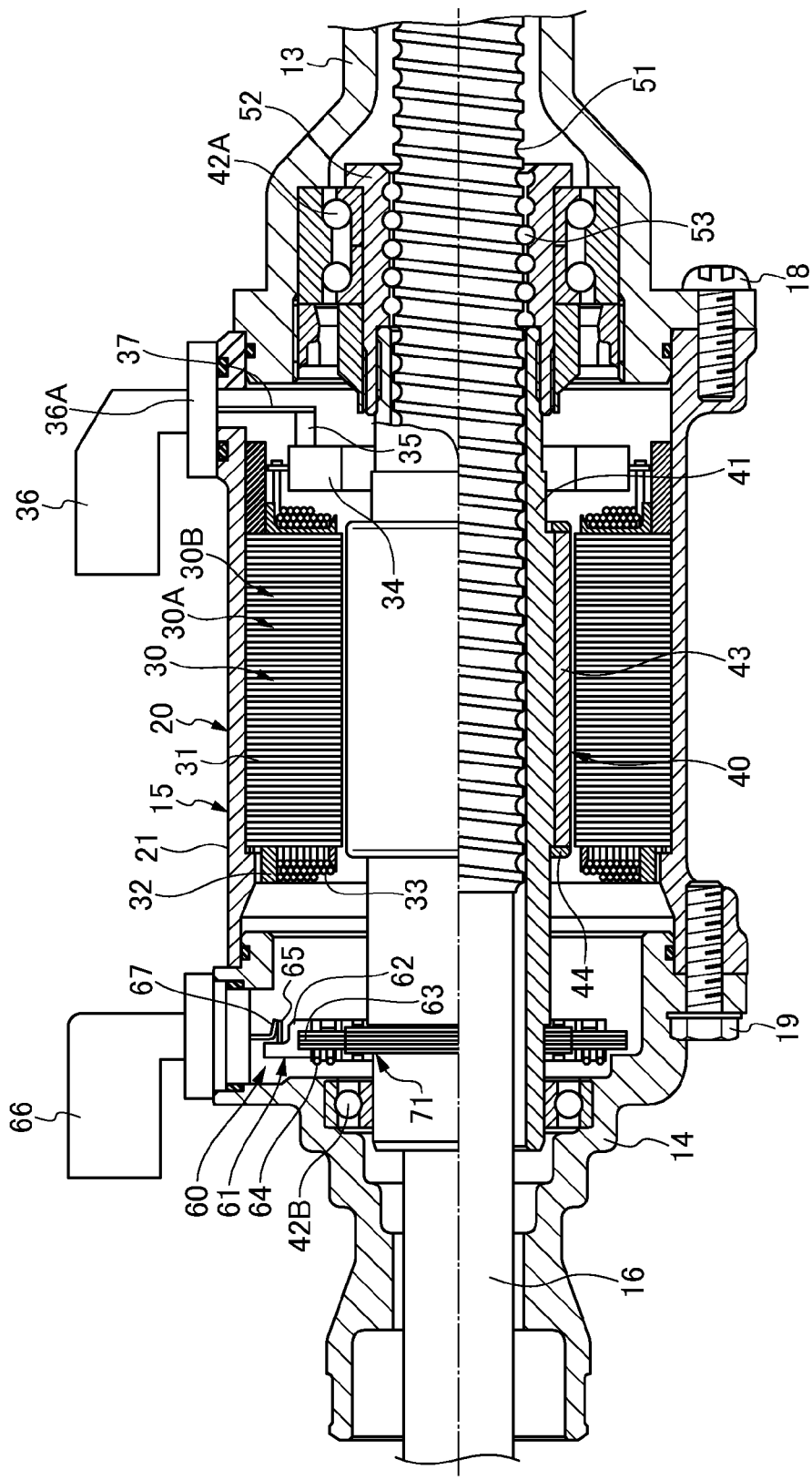
FIG. 2 is a cross sectional view of a main portion in FIG. 1.

The motor stator 30 has a core assembly 30A structured by adjacently arranging a plurality of, for example, four in each of U-phase, V-phase and W-phase (totally twelve) in the present embodiment, core subassemblies 30B installed and fixed to an inner periphery of the motor housing 21 on a circumference, as shown in FIG. 2. The core subassembly 30B is structured by laminating a core 31 constituted by a plurality of silicon steel plates, attaching a resin bobbin 32 to the laminated core 31, and winding the motor coils 33 respectively forming three phases comprising the U phase, the V phase and the W phase around the coil winding portion of the bobbin 32. Three feed terminals 35 (connected terminals) are connected to the terminals of the respective motor coils 33 via a bus ring (not shown) embedded in a resin portion 34 attached to the bobbin 32 in the present embodiment. Each of the feed terminals 35 is structured to be resin molded in a root portion connected to the bus ring, and weld in sequence each of one end protruded from a resin portion 36A of a connector terminal 37 (a connecting terminal) for connecting each of power supplies of the U phase, the V phase and the W phase embedded in the resin portion 36A of the connector 36 so as to be drawn into the inner portion of the motor housing 21, to each of the portions protruding from the resin portion 34. The connector 36 is fixed to the motor housing 21.

The motor rotor 40 has a hollow rotating shaft 41 arranged around the rack shaft 16 over a longitudinal direction of the motor housing 21, as shown in FIG. 2, a ball nut 52 mentioned below is fixed to one end portion of the rotating shaft 41, the ball nut 52 is pressure inserted to the bearing 42A of the gear housing 13 so as to be rotated, and the other end portion of the rotating shaft 41 is pressure inserted to the bearing 42B of the second housing portion 14 so as to be rotated. A rotor magnet 43 is positioned in a circumferential direction via a magnet holder 44 so as to be fixed at a position facing to the motor stator 30 in an outer periphery of the rotating shaft 41.

The motor-driven power steering apparatus 10 is structured, as shown in FIG. 2, such that a ball screw 51 is provided in the rack shaft 16, and a ball nut 52 engaging with the ball screw 51 is fixed to one end portion of the rotating shaft 41 mentioned above. A steel ball 53 is retained between a thread groove of the ball screw 51 and a thread groove of the ball nut 52, and a rotation of the ball nut 52 is converted into a linear movement of the rack shaft 16 by the ball screw 51.

The resolver 60 is constituted by a resolver stator 61 assembled at a fixed circumferential position with respect to the motor stator 30, and a resolver rotor 71 assembled at a fixed circumferential position with respect to the motor rotor 40, as shown in FIGS. 2 to 4. The resolver rotor 71 is structured by an annular core in which a plurality of salient poles are arranged in a circumferential direction. The resolver stator 61 has a plurality of stator coils 64 in which a coil is wound around a laminated iron core 63 retained in an annular resin portion 62. Terminals of the stator coils 64 are connected to a plurality of (six in the present embodiment) detection signal output terminals 65 (connected terminals) resin molded and retained in the resin portion 62. Each of the detection signal output terminals 65 are welded in sequence to each of one end protruded from resin portions 66A of a plurality of (six in the present embodiment) signal unloading connector terminals 67 (connecting terminals) embedded in the resin portion 66A of a connector 66 so as to be drawn to the inner portion of the housing portion 14, to each of the portions protruding from the resin portions 62. The connector 66 is fixed to the housing portion 14.

Accordingly, in the present embodiment, in order to stabilize an arc generation and improve a weld quality, at a time of in-sequence arc welding (a weld portion 69 in FIG. 3) a plurality of (six in the present embodiment) lined-up connector terminals 67 (the first to sixth connector terminals 67A to 67F) (the connecting terminals) of the connector 66 respectively to a plurality of (six in the present embodiment) lined-up detection signal output terminals 65 (the first to sixth detection signal output terminals 65A to 65F) (the connected terminals) of the resolver stator 61, by using an arc welding machine 100 during manufacture of the electric motor 20, the following welding method is employed.

The arc welding machine 100 is structured such as to carry out, for example, an inert gas tungsten arc welding (a TIG welding), is provided with a torch 100A retaining a welding rod 101, and is provided with an earth terminal 100B connected to an earth connecting device 200, as shown in FIG. 3. The earth connecting device 200 has a plug 201 which can be attached to and detached from the connector 66, is provided with a switch terminal 203 which can be switched and connected in sequence to a plurality of (six in the present embodiment) connecting portions 202 (the first to sixth connecting portions 202A to 202F) of the plug 201 connected to a plurality of connector terminals 67 of the connector 66, and connects the switch terminal 203 to the earth terminal 100B.

At a time of in-sequence arc welding one end of each of a plurality of lined-up connector terminals 67 of the connector 66 to each of a plurality of lined-up detection signal output terminals 65 of the resolver stator 61 by the welding rod 101 provided in the torch 100A of the arc welding machine 100, the plug 201 is fitted and attached to the connector 66. Further, the other ends of the respective one end of a plurality of connector terminals 67 are connected in sequence to the earth terminal 100B of the arc welding machine 100 via the respective connecting portions 202 of the plug 201 and the switch terminal 203. For example, at a time of arc welding the one end of the first connector terminal 67A to the first detection signal output terminal 65A by the welding rod 101 provided in the torch 100A of the arc welding machine 100, the other end corresponding to the one end of the first connector terminal 67A is connected to the earth terminal 100B of the arc welding machine 100 via the first connecting portion 202A of the plug 201, and the switch terminal 203 connected to the connecting portion 202A.

In accordance with the present embodiment, the following operations and effects can be achieved.

(a) At a time of in-sequence arc welding each of the one end of a plurality of lined-up connector terminals 67 by the welding rod 101 of the arc welding machine 100, each of the other ends corresponding to the respective one end of the connector terminals 67 is switched and connected in sequence to each of the earth terminals 100B of the arc welding machine 100. Accordingly, in the welding rod 101 of the arc welding machine 100, the arc is securely generated only between the welding rod 101 and the one connector terminal 67 corresponding to the present weld subject in which the earth terminal 100B of the arc welding machine 100 is connected to only one connecting terminal, and the arc is stabilized. Therefore, it is possible to improve the weld quality between the one end of a plurality of connector terminals 67 and a plurality of detection signal output terminals 65.

(b) It is possible to improve the weld quality between the one end of a plurality of connector terminals 67 and a plurality of detection signal output terminals 65 of the resolver stator 61.

As heretofore explained, embodiments of the present invention have been described in detail with reference to the drawings. However, the specific configurations of the present invention are not limited to the embodiments but those having a modification of the design within the range of the present invention are also included in the present invention. For example, the structure may be made such as to connect in sequence each of the other ends corresponding to the respective one end of a plurality of connector terminals 37 to each of the earth terminals 100B of the arc welding machine 100, by using the earth connecting device 200 mentioned above, at a time of in-sequence arc welding each of the one end of a plurality of lined-up connector terminals 37 to each of a plurality of lined-up feed terminals 35, by the welding rod 101 provided in the torch 100A of the arc welding machine 100, in the side of the motor stator 30. In accordance with this structure, it is possible to improve the weld quality between the one end of a plurality of connector terminals 37 and a plurality of feed terminals 35 of the motor stator 30.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A method for arc welding electrical connections between a stator of an electric motor and a plurality of lined up connector terminals coupled to a connector of the electric motor, comprising the steps of:
   connecting an earth connecting device between an earth terminal of an arc welding machine and the connector; the earth connecting device provided with a switch terminal operable to selectively interconnect one of the plurality of connector terminals with the earth terminal; and
   successively switching the switch terminal between each of the connector terminals and arc welding the connecting terminal then coupled to the earth terminal by a welding rod provided in a torch of the arc welding machine, until each of the connector terminals has been separately arc welded.

2. The method according to claim 1, wherein said plurality of connected terminals are constituted by detection signal output terminals of a resolver stator.

3. The method according to claim 1, wherein said plurality of connected terminals are constituted by feed terminals of a motor stator.

4. The method according to claim 1, wherein the earth connecting device has a plug capable of being attached to and detached from the connector.

* * * * *